United States Patent
Patrovsky

(10) Patent No.: US 8,540,874 B2
(45) Date of Patent: Sep. 24, 2013

(54) ROTARY CARTRIDGE FILTER WITH ATTACHMENTS

(76) Inventor: Hubert Patrovsky, Laval (CA)

(*) Notice: Subject to any disclaimer, the term of this patent is extended or adjusted under 35 U.S.C. 154(b) by 0 days.

(21) Appl. No.: 13/507,901

(22) Filed: Aug. 6, 2012

(65) Prior Publication Data
US 2013/0032523 A1 Feb. 7, 2013

Related U.S. Application Data

(63) Continuation of application No. 11/894,291, filed on Aug. 22, 2007, now Pat. No. 8,262,908.

(51) Int. Cl.
*B01D 63/00* (2006.01)
*B01D 37/00* (2006.01)

(52) U.S. Cl.
USPC ........... 210/236; 210/232; 210/767; 210/142; 210/321.68; 210/455

(58) Field of Classification Search
USPC .............. 210/236, 232, 767, 142, 321.68, 210/455
See application file for complete search history.

(56) References Cited

U.S. PATENT DOCUMENTS
6,582,598 B2  6/2003  Patrovsky

OTHER PUBLICATIONS
U.S. Appl. No. 11/894,291, filed Aug. 22, 2007, H Patrovsky.

*Primary Examiner* — Krishnan S Menon
*Assistant Examiner* — Allison M Gionta

(57) ABSTRACT

A rotary filter is provided with greatly expanded filter media area within the flow stream of material to be filtered due to use of a series of cylindrical filter cartridges consisting of a core and cylindrical filter media that are attached to and within a rotary disc, thus providing much greater filter area within the size constraints of the rotary disc and the flow channel. This allows removal of contaminating material in the flow stream. The retaining methods used for these cartridges restrains their movement within the flow stream thus allowing backflushing by reversing flow direction and venting the backflush material. The attachment and construction further allows easy removal and replacement of filter media and cartridges.

6 Claims, 12 Drawing Sheets

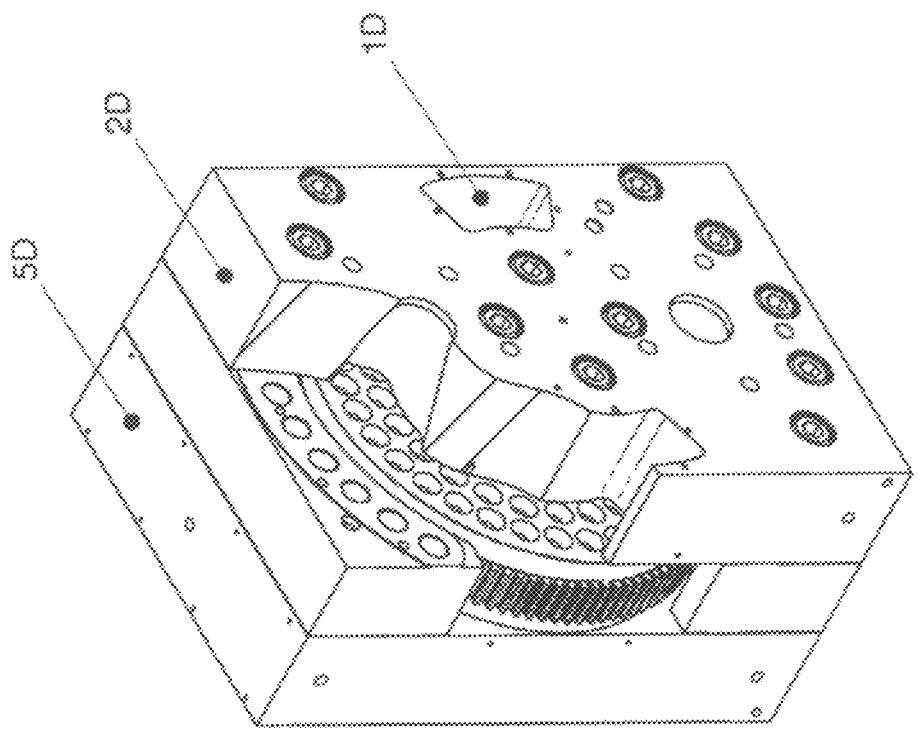
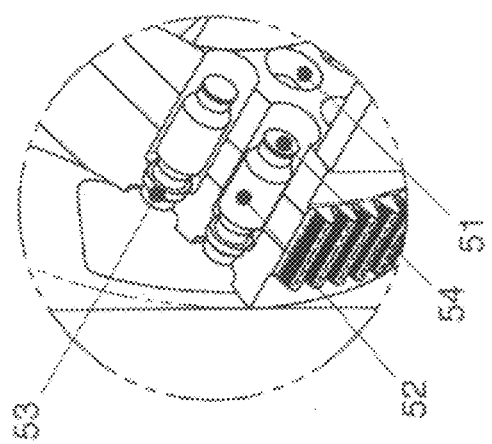
FIGURE 5

ROTARY CARTRIDGE FILTER WITH ATTACHMENTS

STATUS OF APPLICATION

This is a continuation of application Ser. No. 11/894,291 (art unit 1777) filed on Aug. 22, 2007 now U.S. Pat. No. 8,262,908 containing claims withdrawn in processing that application at examiners request. Claims examined are noted and removed in this paper.

FIELD OF INVENTION

A rotary filter is provided with greatly expanded filter media area within the flow stream of material to be filtered which is provided by a series of cylindrical filter cartridges that are attached to the rotary disc, thus providing much greater filter area within the size constraints of the rotary disc and the flow channel thus removing contaminating material carried within the cartridge filters.

BACKGROUND OF INVENTION

Rotary filtration started with a design of Werner & Pfleider in Germany. The basic concept continued in subsequent designs of Rehau and Gneuss, also German firms. Most recently Patt Filtration in Canada has further improved and produced equipment for rotary filtration. This invention builds upon the wave filter design of U.S. Pat. No. 6,582,598 filed Dec. 14, 2000 which doubled the available filter area within a given size filter by again more than doubling the wave filter area.

A normal or typical rotary filter is used to provide continuous filtration of materials with a constant pressure drop through the filter. It consists of a rotatable disc clamped between two blocks or side plates which have flow through channels in each. Flow is from an input block through the flow through shaped and expanded area channels which communicates between the input side, through a portion of an annular filter support and filter media containing area of the disc, and to and through a similarly shaped expanded area exit side flow channel to further processing equipment. The rotation of the disc brings new, non-contaminated filter media and the associated filter supports from the flow channels into the flow through area of the filter and filter support. At the same time, as the disc rotates, a small amount of material is removed with the associated contaminated filter media and filter support. Sealing is metal to metal making a properly constructed filter leak free. The screens or filter media used is held in place by edge friction or by holding rings but the design does not permit backward flow and in some cases retaining bars are needed to prevent backward movement of the filter media. Any such backward movement would result in jamming of the filter media in the metal to metal seal surfaces surrounding the filter which are the lands separating filter media containing chambers. Such jamming can damage the leak free seals.

The rotary filter, while an established technology, is poorly understood. A series of factors such as venting of filter channels, the hardening and the coatings needed to provide corrosion and antigalling protection, the forces used for clamping the parts together to form a seal, and the method to drive the rotary motion are all being changed as the knowledge of the system function improves. Since the filter is very expensive and involves extreme machining accuracy, methods to expand the filtration capacity of a given size filter is especially important. There has been little improvement in the filtration capacity of a disc of a given size until the above mentioned Wave Filter was developed and since then the improvements in filter area have again stalled. Despite the lack of progress, there is a continuing need to improve flow capacity of the filters.

A rotary filter has unique advantages for many applications. It is usually used for high viscosity materials and these are often at high temperatures. A typical use is to filter molten polymers at temperatures of 350 to 750 degrees Fahrenheit and pressures of 2,000 to 12,000 pounds per square inch. The properly designed and produced rotary filter has essentially no leakage at the molten polymer conditions. It also provides essentially no pressure variation within the process stream as the filter media is changed to bring new filter media into the flow stream of material (such as molten polymers) needing filtration since the lands between filter chambers are always present in a constant area within the fluid flow path thus evening the effect to changing from dirty filter chambers to clean filter chambers. It also permits incremental changes in the filter chamber advance rate so that the contaminant load on the filters may be kept relatively constant despite varying contaminant loading in the fluid being filtered. The rotary filter further resists high temperatures and pressures of flow streams being filtered. The downside of all of these advantages is that costly materials and machining methods are essential to the success of the rotary filter, making it an expensive filter.

While the rotary filter has many advantages, one big disadvantage is that the area for filtration is highly constrained. The filter media is placed in flat arrays within filter chambers machined in the rotating filter disc. The filter area (chamber area) can be, at its maximum, only a small sector of the annular ring formed within a filter disc. In numerical terms, in a few small filters the ratio of filter area in the flow stream being filtered to the total area of filter chambers on the disc may be as low as $\frac{1}{25}$. In most lower pressure rotary filter applications the maximum of filter area in the flow stream to total filter area of filter chambers on the disc is $\frac{1}{5}$. In the usual high viscosity filtration use, the filter construction is further constrained by the need for support of the filter media. Due to very high flow stream pressures substantial support plates, typically a thick plate with drilled flow through holes (in contrast to many cartridge filters which handle low pressures and have very thin supports or no supports) are needed. The balance of internal forces and the need to access the filter support to replace contaminated filter media usually restricts the surface area within the flow stream to no more than about 20% of the annular ring area. There is a need for higher flow area contact with filter media in rotary filters.

In a filter handling a viscous material, the filter media, which may have capacity of filtering particles ranging from tens of thousandths of an inch in diameter to microns in diameter and which may consist of several layers of filter media such as screen or sintered metal strip, has by far the greatest resistance to flow of the materials being filtered. In the most common applications of rotary filters, the filtrate is a molten polymer and the stainless mesh screen filter media has mesh of 400 to 20 mesh depending on the application. These screens are stacked together to remove contaminants and so that the finer screens are reinforced by the thicker screens to prevent screen breakage. Use of sintered strip has been very limited due to the rapid clogging of this very expensive filter media and the high pressure drop through most sintered filter media.

The filter support and the chamber that hold the filter media are also potential problems. There is a desire to minimize the volume of the filter chamber to minimize the amount of fill in each chamber which affects fill time and so flow rates through each part of the chamber are sufficient to prevent time/temperature degradation of the filtrate (the fluid being filtered). This means that the depth of the filter chamber and especially its area are key design considerations. It is beneficial to minimize both depth and area of the filter chamber for flow reasons, however, the maximum area is beneficial to lowered total pressure drop and to increased filter capacity. In addition, the filter support, which is a plethora of small drilled holes, typically in the 2 mm to 5.5 mm diameter range, causes some resistance to flow. These small holes create a pressure drop that increases as hole diameter decreases and as hole depth and total flow increases. The depth of the holes in the filter support also is a function of the needed stiffness (which is a function of material and thickness) of the rotary filter disc. Looking at all of these factors, typical disc thicknesses are in the range of 20 to 50 mm with the required stiffness being a predominate controlling factor that keeps the disc thickness high despite the adverse pressure effects due to thickness. Greater thicknesses of the disc and the resulting improved stiffness and lowered distortion would mean either larger free area in the filter chamber and the resulting holdup of filtrate or higher pressures due to longer drilled hole lengths in the support plate. There is a need for a method to increase disc thickness without increasing free area (hangup) or pressure.

The steel used in production of the rotary filter disc is also an expensive high alloy specialty steel. The cost of the steel suggests that the rotary disc is kept to a minimum thickness, typically around an inch thick. First and foremost, the disc must be totally distortion free. Flatness of both sides and the parallelism of the two sides must be within microns. Increasing disc thickness increases disc cost but makes the disc more resistant to distortion.

The active filter areas within the rotary filter have been flat areas within the rotary disc. Specifically filter media chambers are machined into the filter disc and are separated by webs or lands that effect seals with the body plates surrounding the filter containing rotary disc. These filter chambers are shallow flat bottomed areas with the filter support and through holes in this flat bottom area. Filter media is placed into the chambers, resting on the flat surface of the bottom of the chambers and held into place by friction with the shallow walls of the chamber. The patented advance of the wave filter allowed greater filter area by corrugating the filter media and machining the same wave or corrugation shape in the filter support so that the filter media was totally supported and thus did not distort despite the filter media wave like shape Flat filter supports and flat filter media has been used in all rotary filters except the wave filter because flat filter media is cut so that there is an effective slight interference with the filter chamber walls. This slight interference holds the filter media in place by interaction with the side walls of the filter chamber. Holding the filter media in place in this way insures that the filter media never rises higher than the depth of the filter chamber. The filter media is thus frictionally prevented form moving or falling into a position where the filter media can become wedged into the metal to metal seal between the rotary filter disc and the blocks that constrain the rotary disc. This is important because the tight metal to metal seals of a rotary filter can be destroyed if the filter media is caught between the filter disc and the side plate blocks that constrain the internal flow pressure of the fluid being filtered as the rotary disc moves. An improved method that provides a positive grip to restrain movement of filter media would be an improvement in rotary filtration.

There remains a need for finer filter media, greater filter media area for a given size filter and for economic use of filter media.

DESCRIPTION OF THE INVENTION

A rotary filter where a disc containing filter supports and filter media within machined filter chambers is radically changed by the abandoning of the flat filter media concept behind present rotary filter products and the adapting of the filter to a series of small cylindrical filter cartridges within the construction bounds of the rotary filter. As a result the same stepless pressure profile and the leak free features of the rotary filter is preserved but the filter area is increased to four times that of a flat filter and twice that of the patented wave filter. The construction of the individual filter chambers is drastically altered by the addition of added thickness to the rotating disc and the installation of a number of individual filter chambers within the disc spaced to optimize the number of filter cartridges and with the chamber walls and flows altered to handle the new cartridge concept within the filter. The cartridge filter concept can be further improved by clustering the cartridges in a removable base chamber which allows ease of access to the cartridges.

A number of advances were required to make this cartridge filtration method work within the rotary filter design concept. Cartridges were often small sintered metal moldings. Sintered filter media was typically weak and might fail in use when high pressure drop through the filter media was encountered. The sintered filters were often used in cartridges where they could be multiply reinforced by screens or perforated metal supports and were also commonly used in easy flowing materials such as oil and hydraulic fluids rather than polymer materials. To make small cartridge units with flow characteristics needed for high viscosity (hard to flow) materials, screens and screen supports would normally be needed. The flow within the cartridges and the strength needed was a problem. Unfortunately, due to space and flow considerations, the rotary filter concept previously contraindicated the use of cartridges.

When screen based filter cartridges were made, they were typically large cylinders using internal corrugations to provide a very large filter area. The candle filters used in dope filtration (solvent based polymer solutions) in such areas as low denier textile fiber and cigarette filter fiber or tow manufacture were typical of the candle manufacture. These cylinders housed within a cylinder of 3 to 12 inches in diameter and 1 to 3 feet long containing wrapped fiber filters where fiber wound around a perforated core was the filter. In other candle filters fine wire mesh was corrugated. In these cases the dope was relatively fluid (in the centipoise ranges) and the filters were easily crushed or had terrible throughput when they encountered high viscosity fluids in the poise viscosity range. Cartridge filters had proven ineffective in most polymer filtration applications. Candle filter changing also causes major flow disruptions where at best valving between candles causes a major line surge and at worst down time is required to change the filters.

The end pressures in a typical cartridge subjected to high pressure drop across the filter media was also far from optimal. A reinforced end part was required to prevent end blowouts. Since the cylinder shape also provided a flow obstacle where the flow pattern would deviate from the smooth laminar flows required in the processing of high viscosity polymers, a solid shaped end with a semi-spherical outer side cab be used that directs the polymers or fluids smoothly around the top end of the filter cartridge and that includes a cone shape within the filter cartridge. This was developed to remove and reinforce the cartridge end and also to make the flow more laminar at the end of the filter cartridges. The internal conical shape further directs the flow to the center and prevents a dead flow area at the top end of the filter cartridge. With this general configuration, flow from the outer side of the cylinder is directed around the end to the active filter portion, then within the cylinder, the filtrate is forced to flow in a laminar flow through the cylinder, exiting at a tapered exit area leading away from the rotary disc with the included filter cartridges to the exit adaptor and further processing equipment. The solid end also contributes to economy of construction and to the cartridge strength. The screens that form the finer filtration may be fixed on a core by welding or other fasteners or may just use the flow of polymers through the screen to hold in place a slip on cylinder of screen that slides over a core which contains a support and a top and bottom.

The spacing of filter cartridges and the number of cartridges within the flow stream is highly variable and the invention anticipates a number of configurations, although the concept of this invention includes variations obvious to a practitioner in the field but not specifically claimed herein. One clear possibility would be to array the filter cartridges, each in a machined tapered hole with a bottom attachment wherein the fluid flows into the tapered hole (the taper is to improve flow and prevent dead areas), through the filter cartridge and exit into the flow channel on the other side of the rotary disc. This concept while workable and simple does however have the problem of relatively dead flow areas around the top and bottom edges of each individual hole which can be contraindicated with degradable materials. The flow also decreases with filling of the filter media with contaminants and thus the flow in a given hole may also be seriously & adversely impacted.

While single shaped holes within and spaced so as to maximize flow and minimize land effects are an approach, a set of filter cartridges spaced within a chamber offers considerable advantages in both flow uniformity and filter area in the flow paths as well as in elimination of dead areas within flow paths. A filter chamber which has the approximate spacing of the filter chambers in prior rotary filters (i.e. 15 to 36 chambers in a one meter diameter disc), and where the starting and ending widths of the lands separating the filter chambers remains the same, is used in this invention. The shape of the lands separating the chambers has increasing width up to near the center of the lands and then the width decreases. This land shape, outwardly placed in an annular band of a rotary disc and looking like a pair of parentheses (0) allows a flow channel in a modified T shape where two or more cartridges may be arrayed at the outer end of the chamber and a row of single filter cartridges may be arrayed the length of the filter chamber. In this manner 5 or more filter cartridges may be placed within a single filter chamber with good flows and minimal dead areas resulting from this placement. If the bottom of the filter chamber holding the attachment means that keeps the individual filter cartridges in place is also made removable, the filter cartridges may be made easily accessible for removal and changing and the filter thus more useful.

The filter flow path to the rotary disc and from the disc to the adaptor and further processing equipment is also important. The flow path, configured in prior filters to the approximate shape of the filter chamber lands and configures to contain several filter chambers and a constant amount of land surface area, in this invention is configured to again contain several filter chambers and a relatively constant area of land within the flow channel. The flow area in contact with the rotary disc thus will approach the shape of three or more filter chambers without the intervening lands. While some deviation from the ideal may be used in an effort to improve flow or sealing, the general approach to sealing and the dampening of pressure effects from land introduction into the flow path is similar to that of the prior rotary filters despite the much greater filter media surface area and the cylindrical shapes of filter media made possible with filter cartridges.

To insure the filter media does not change position or get pushed either into the outlet flow channel or is back pressed into the entry flow channel holddowns are suggested with filter cartridges. A variety of holddown methods are described. One method that works very well to constrain the filter media containing cartridge from escaping outside the confines of the filter chamber is a bottom (the direction opposite from the inflow of fluid) threaded portion attached to and made part of the filter cartridge. This is important since, when the disc is rotated through side plates that constrain and contain a fluid flow stream, a filter media that projects upward into the area between the side plate and the disc can cause severe damage to the metal to metal seal constraining the fluid being filtered. The cartridge use requires a thicker rotary disc but the seal problems are not changed by a thicker disc which does not cause flow or pressure problems. The use of an attached filter core which includes the top, filter support cylinder, and the bottom ring but has a slidable filter screen that overlays the support core and is held in place by frictional forces and the flow of polymer is also used in cases to cut filter media costs.

A rotary filter consists of an annular disc containing filter chambers which rotates around an axis, and as it rotates successively moves one or more of the filter chambers into a fluid flow stream. The disc is constrained by two side plates, aligned with each other, one in contact with a portion of each flat surface of the disc. Within these side plates is a fluid flow channel aligned such that the flow channel allows fluid communication from one side plate, through a portion of the rotary disc, and into the second side plate. The side plates are tightened by a series of bolts at the center of the annular disc rotation and by bolts arrayed outside a portion of the largest diameter of the rotary filter disc. These bolts apply a tightening force squeezing the rotary filter disc between the two side plates which forms a metal to metal seal between each side plate and one side of the rotary disc. When the side plate and the disc surfaces which are in rotary contact are nearly perfectly flat and have hardness and coatings that prevent galling or other effects that prevent rotation of the rotary filter disc, the disc may be rotated freely. The disc center of rotation is remote from the fluid flow channel within the side plates and there is an annular filter zone of the disc created by the fluid flow channel as the rotary disc rotates around its axis of rotation.

A series of filter chambers are located upon the rotary disc. The chambers are in the annular filter zone of the rotary disc. Each filter chamber is cut into the surface of the disc and each filter chamber is separated by a web (or land) of the rotary disc surface from adjacent filter chambers. Each web runs in a roughly radial direction from the center of the annulus. The shape of the web typically accommodates a portion of the flow channel shape. The filter chambers are arrayed around the disc in an annular zone.

A standard (old style) rotary filter as currently produced has a relatively thin disc. This disc contains a series of filter chambers arrayed within an annular area such that the rotation of the disc brings each filter chamber through the loci of a flow stream which is contained between a pair of side plates which surround the rotary disc, each on one flat surface, and which form a metal to metal seal with the disc. Each of the filter chambers is separated from the next chamber by a web which is part of the disc surface and thus forms seals with the side plates.

In prior practice, filter chambers were shallow cavities which typically had flat bottom surfaces. These bottom surfaces had through holes that extend from the bottom through the disc to the other surface to allow for through flow of the filtrate. A set of wire screens or other similar filter media sits on the flat filter bottom and is held in place by frictional forces of the filter media against the walls of the shallow chamber. The hole containing bottom of the filter chamber, also called the filter support, may be part of the rotary disc or it may be removable, held in place by a holding means such as tabs or steps or taper fit between the support and the wall of the rotary disc filter chamber.

In the present invention the concept of the filter chamber has been radically revised. The bottom of the chamber is sculpted to provide a series of contours that terminate in large drain holes, typically 3 to 10 of these large holes per filter chamber. The webs or lands surrounding the drain holes are modified to provide a relatively uniform free space around the holes, straight sided holes or more ideally tapered holes such that a high viscosity fluid would have less flow volume near the outlet end of any cylinder placed within the drain hole. The outlet end of the breaker plate drain holes is threaded and may have additional sealing surfaces or shoulders in contact between the cartridge base and the disc to enable a filter cartridge placed and attached within the filter chamber to interact with the fluid flow through the cartridge and to have the filter cartridge under axial compressive forces. This compression permits the construction of filter cartridges that have much greater strength than if the reverse attachments were used. Slidable filter media may be employed as the outer layer of the filter making such an outer layer easily changeable.

The total mass flow through the filter chamber can be the same but the extra filter area now possible also permits much higher flow at the same pressure drop within a given filter disc size. The new configuration also may permit finer filtration with the greater filter area made possible thus permitting the same mass flow despite the finer media and higher flow resistance of the finer filter media.

As viscosity increases two factors enter into the fluid flow area consideration. First the filter media or screens must resist a significant pressure caused by the fluid resistance to flowing through the fine filter media mesh. Second, the filter support must be rigid enough to not deform under the force of the fluid passing through the filter media and the filter support itself, thus the hole spacing must allow sufficient steel for rigidity. As noted above, the compressive forces on the bottom (outlet side) attached filter cartridges, putting the filters in compression and the much greater filter area make the cartridges effective despite relatively small support mechanisms for the fine filter media. This contrasts with the center loaded massive filter supports required in the wave filters and the flat screen filters. The usual net effect of filtration of very viscous materials thus is that considerable mass of the filter support is needed making through hole size smaller and the thickness of the support greater. The small cylinders under compressive forces negates much of the need for the massive filter supports.

The net effect of the invention is to allow a relatively small rotatable filter within a rotary filtration device to act as a much larger size, thus allowing cost effectiveness and even more important allowing the rotary filter metal to metal seals to work in flow conditions where they were previously not practicable due to the increased filter areas provided by wave bottom filter supports and filter media.

One solution to machining a filter support that allows the filter configuration of the present invention is the advent of electrodeposition machining methods which allows a number of precisely shaped pockets for filter supports to be machined with either straight or angled walls holding a similarly angled filter support in place. Such a precision machined pocket and the filter support that fits into this pocket are firmly held by the matching angled sides of the parts such that the filter support does not protrude in a manner that would interfere with rotation of the disc containing the filter support from the rear of the disc. At the down flow side of the filter, away from the filter media, the angles diverge towards the filter media side so a light tap or pressure allows the removable support plate to be ejected from the filter disc. Even when the angles are the same the filter support plate is easily removable. The precision cut filter supports are totally interchangeable so each removed support can be easily replaced with new or cleaned filter support and filter media. These removable bases containing the filter cartridges allow ease of accessibility in the changing of filter cartridges and permit replacement of entire base units with several filter cartridges at one time.

A key consideration in the design of cartridge filters is the attachment of these filter elements within the filter supports and the rotary disc.

It is also possible to have a cartridge system that has no holddowns with the frictional fit with or over the filter support or within the exit hole sufficient to trap the filter media and prevent the movement and leaking of the filter cartridge in use. This depends on somewhat variable frictional forces and thus is not as sure as the above threaded holddowns but the concept is workable.

In this invention a variety of specific holddown methods are shown but the basic concept remains a cartridge attached within a filter support which has a method or means of preventing the upward motion of the filter media into the space of the filter chamber where the filter media may interact adversely with critical sealing surfaces or prevent rotary motion. The specific methods of preventing this motion are ideally threaded attachment but rod retainers, holddown rings or engaging projections are among the many possible holddowns anticipated within this invention. While specific configurations are discussed and revealed as embodiments, the words used herein should not be construed in a broader context than the text permits and all holddowns are part of a technology that permits the use of cartridges in a rotary disc filter for polymers and similar viscous materials. The concept is especially valid for rotary filters since the rotary filter is essentially unique in its use of metal to metal rotating seals.

DESCRIPTION OF DRAWINGS

In FIG. 5 the cartridge filter is shown in another configuration where individual cartridge chambers, arrayed in annular rings, are used rather than a multi-cartridge chamber.

PREFERRED EMBODIMENTS

Figure 1:
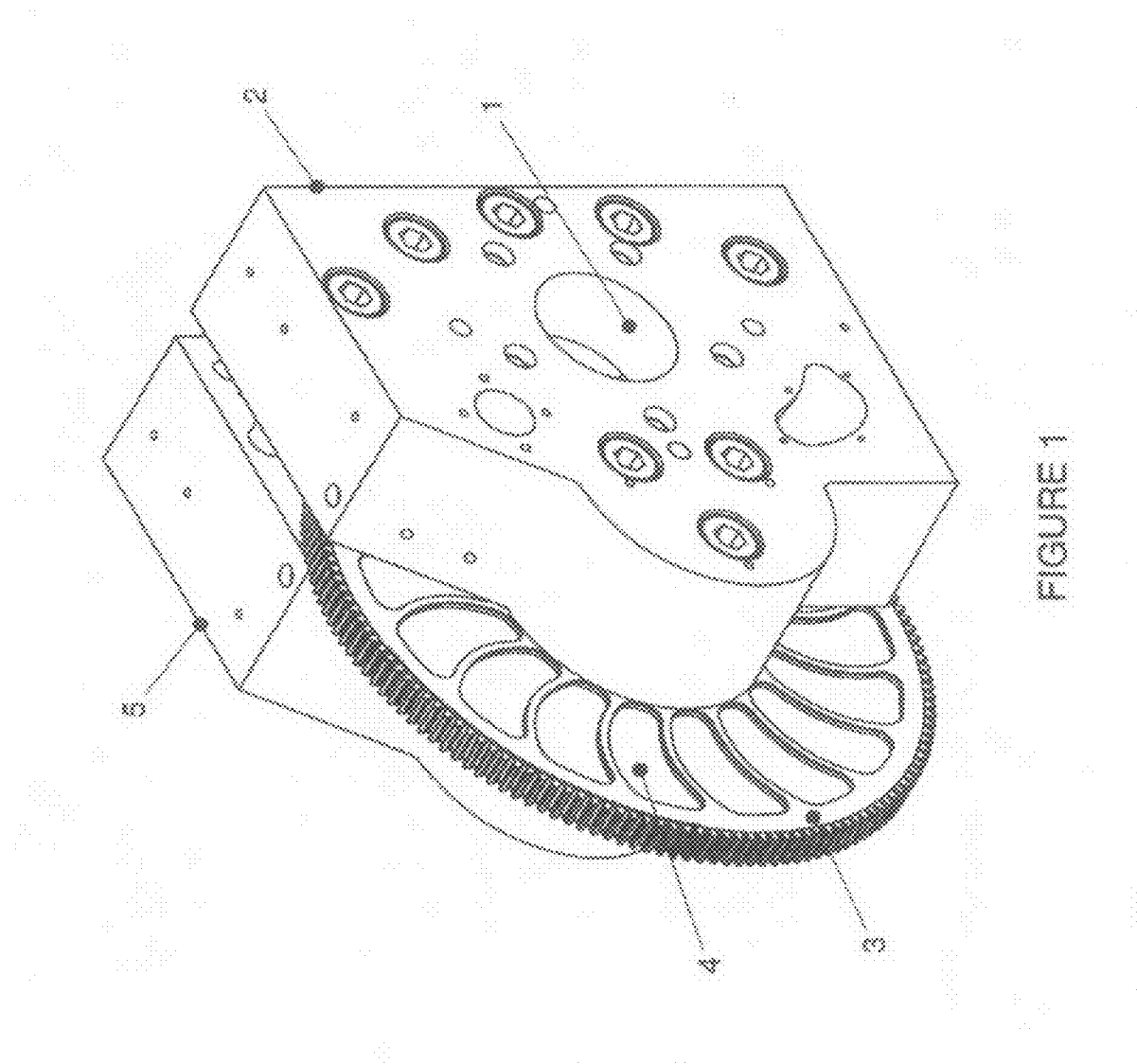
In FIG. 1, a typical rotary disc filter is shown, assembled. The disc is shown projecting from side plates and filters chambers are shown on the disc.
Figure 2:
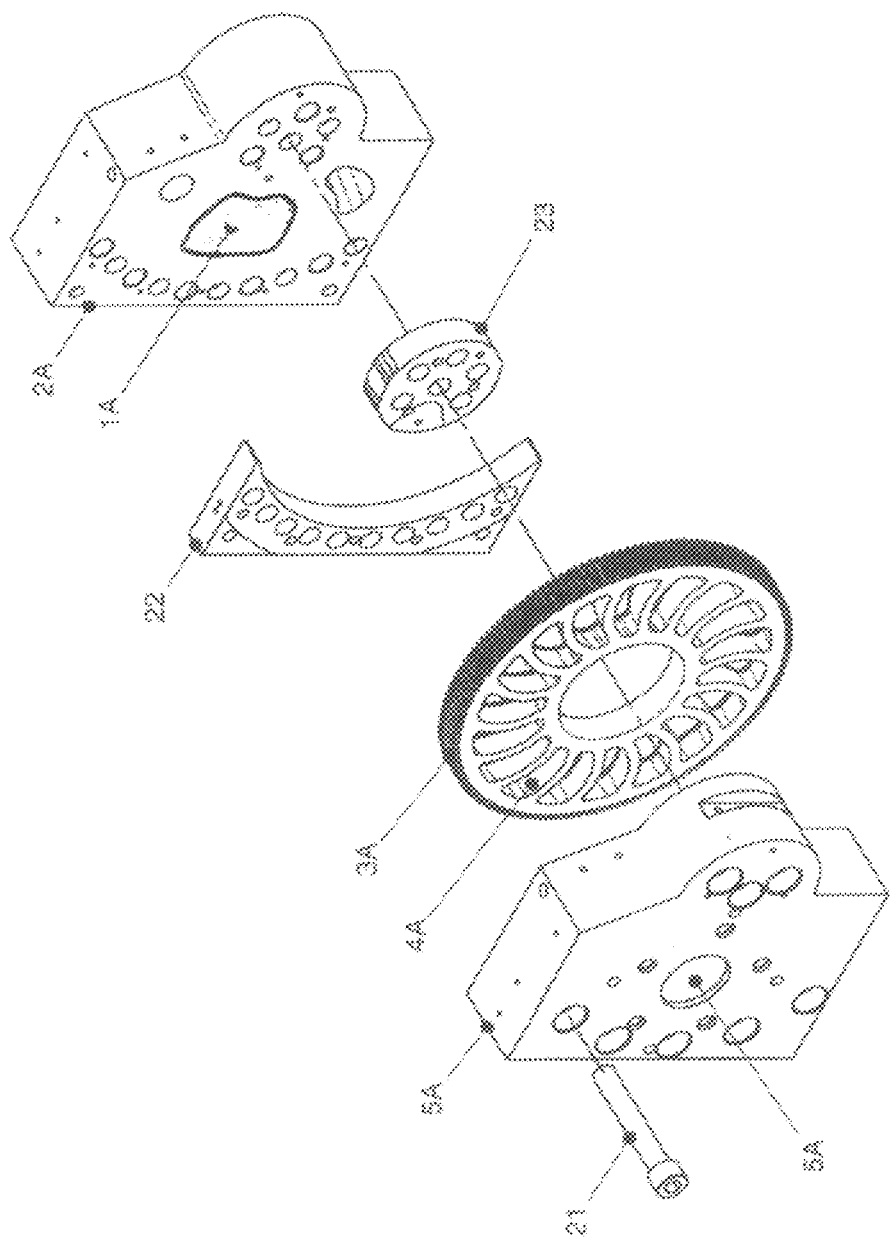
In FIG. 2, the typical rotary disc filter is shown in a disassembled condition with key parts marked.

In the discussion of the preferred embodiments the parts and the past advances must be first defined. FIG. 1 shows a present normal rotary filter assembled with inflow blocks 2 surrounding a flow chamber shaped to allow large contact by the fluid within the flow channel 1 to contact the disc and flow through the filter chambers 4 to an outflow channel mirroring the inflow channel in outflow block 5. The exploded view of the standard filter shown how the flow channel may be configured and shows the parts noted above, the numbers designated by adding A to each, and a spacer 22, and a rotation hub 23 shown as the constraining elements that insure clearance to permit rotation of the disc 3A. A series of bolts 21 clamp the parts together.

Figure 3:
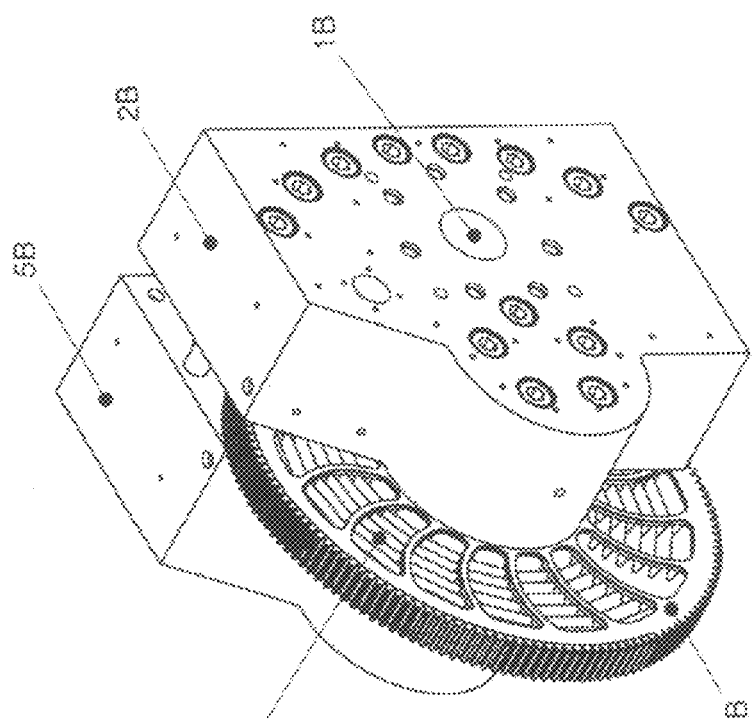
In FIG. 3, a view of a corrugated rotary disc is shown with the screen covering cut away to show the filter support and where end tabs are used to hold the filter media in place.

The last major increase in filter capacity is shown as FIG. 3 where the same blocks 2B and 5B clamp the disc 3B which has corrugated base 31, 31A which enable considerably more (about twice) of the corrugated shape screen 32 area to be exposed to polymer as polymeric fluids flow from the inflow through the filter chambers and filter media 32 and filter support 31 through the mirrored filter flow passage in 5B to further processing equipment.

In the most preferred embodiment a rotary screen changer of "C" size was modified according to the invention. The rotary disc, shown as 3 in FIG. 1 of the older rotary filter, which is normally 35 mm thick and 495 mm in diameter, which is squeezed between inflow blocks 2 and outflow blocks 5, is modified by making it 17 mm thicker bringing total thickness to 52 mm as shown as 3C of FIG. 4. The filter chamber on the disc area 140 mm by 90 mm remains changing from the shape shown in 4 of FIG. 1 with the typical 200 holes, each with a diameter of 4.8 mm that was provided in the normal rotary filter chamber, to the shape shown in 41 of FIG. 4. The chamber is provided with 5 drain holes in the bottom of the thicker or deeper filter chamber made possible by the thickening of the rotary disc 3C. The older filter side or inflow and outflow blocks (FIGS. 1, #2 and #5) contain the inflow passage 1 and the hidden outflow passage in fluid communication with it. These are similar in the cartridge filter with side blocks 2C containing flow passage 1C communicating through part of the rotary disc 3C to the hidden flow passage.

Figure 4:
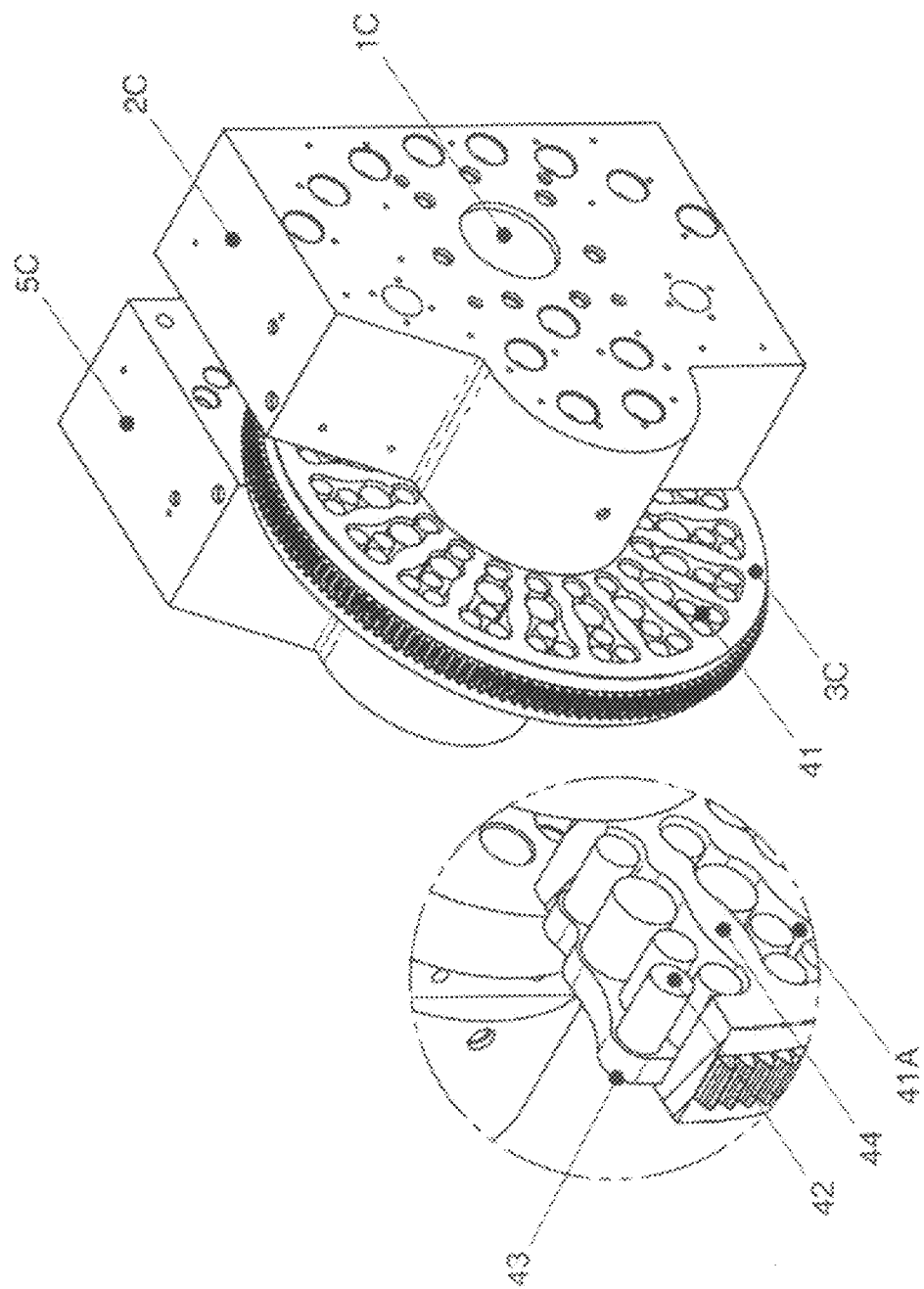
In FIG. 4, a view of a cartridge filter with 5 cartridges per filter chamber is shown.

The disc filter chambers 41 in FIG. 4 are machined in an annular zone of a ground rotary disc 3C which has parallel inlet side and outlet side surfaces. The disc has very close tolerances providing flat surfaces parallel to each other. A series of filter chambers 41, 41A is machined into the disc 3C, typically providing holes 43 that communicate from one surface to the other are then drilled into the disc forming typically 18 areas, recessed into the annular portion of the disc with lands 44 separating the chambers that are part of the original parallel flat surfaces of the rotary disc. There are no machined filter support holes in the bottom of the filter chambers in contrast to the prior filters which had the bottom of each filter chamber drilled with a pattern of 200 closely spaced holes of 4.8 mm diameter which formed a filter support or breaker plate. In this embodiment there are vastly fewer large drain holes (shown variously as 61, 72, and 87) which each accommodate filter cartridges 42. The shape of the filter chamber is machined into the disc, each separate filter chamber containing a hole cluster area. Unlike the normal flat bottom disc, a series of five large drain holes spaced within the filter chamber replaces the 200 holes in prior filters used as part of the filter media support (the breaker plate). Each drain hole is surrounded by either a straight sided or a shaped or conical machined hole, the holes merging in several directions to form a machined area with the several drain holes terminating with threads or other holding means that engage filter cartridges. The same machining steps are done with each of the 18 filter chambers in the annular filter zone of the filter disc. When the filter chambers are completed the disc is heat treated, finish ground to high flatness, further treated with nitride or a hard coating to provide a hard anti-galling surface, then further ground and polished prior to use in the rotary filter.

Figure 12:
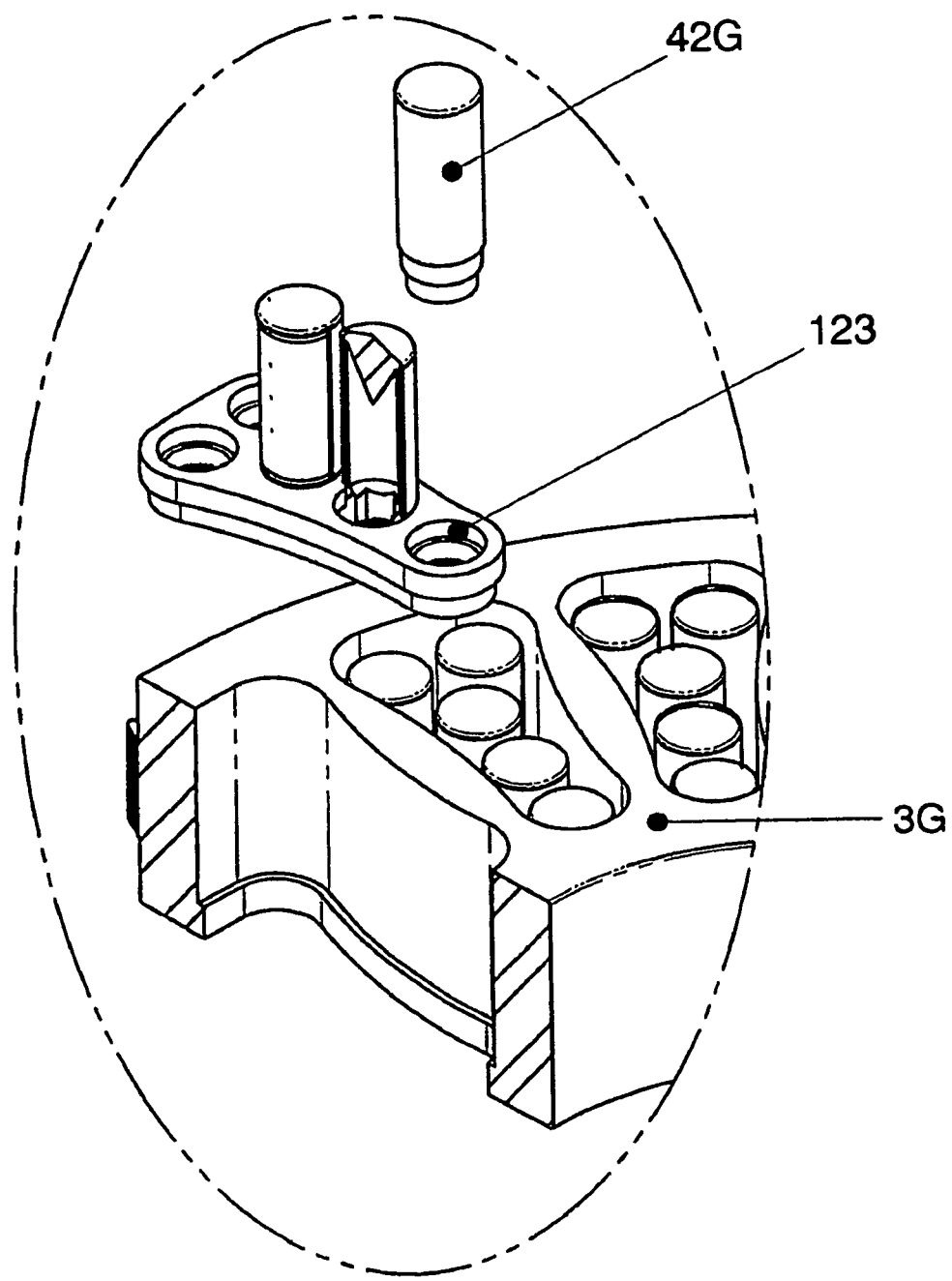
FIG. 12 shows a further exploded view of a filter cartridge where the outer screen is integral to the cartridge and thus non-removable. The screens are welded at the indicated points and the filter cartridges are placed into a removable bottom filter chamber which contributes to ease f cartridge removal and replacement.

Each set of five filter cartridge containing drain holes comprises one of the 18 filter chambers within the annulus of the disc in contact with the inflow and outflow shaped chambers. Shaped lands 44 separate each filter chamber 44 and the lands are spaced such that a nearly identical amount of land is within the inflow and outflow passages thus minimizing pressure variations as portions of the disc is rotated into and out of the inflow and outflow passages 1C within the inflow blocks 2C and outflow blocks 5C which are aligned so as to fluidly communicate with each other after flowing from the inflow side, through a portion of the filter disc and filter to the outflow side chamber. In FIG. 12 the removable bottom feature 121 is shown within the cavity 122 cut within the disc 3G. In this more detailed view the cartridges 42G are shown with the attachment 123 into the disc 3G.

With a series of 90 filter cartridges or more used in most applications, the considerable cost of filter cartridges is a factor in the use of the rotary cartridge filter. Accessibility to the individual filter cartridges is also critical. To solve these dual problems several modifications in the filter design or cartridge design are important. The cartridges which will first be described as welded units as shown in FIGS. 6, 7, 8, & 9 can also be modified to handle slip-on and slip-off removable screen or filter media tubes in place of the welded in place screen or filter media cylinders as shown in FIG. 10. The problem of filter cartridge access and removal can also be solved as described above using interference fit angled removable base plates within the filter chambers, each containing 3 to 6 filter cartridges. For simplicity, the more obvious welded filter cartridges threaded into a fixed hole within the rotary disc are first described and the more complex but more accessible versions are described in the later embodiments. While the simpler design is now preferred, market forces may dictate the use of the more complex versions.

The simpler and most useful filter media is formed into a cartridge by addition of a top flow diverter and a bottom attachment ring to a cylinder of filter media. The cylinder of filter media is, in this preferred version, starts with a flat perforated metal screen or metal plate which has significant strength which is the filter backup or filter support. This support is rolled into a cylinder 64 and welded along the seam. Several additional layers of screen are added in a like manner with a rectangle of 20 mesh and a rectangle of 100 mesh stainless steel square mesh screen added and welded in tight fitting layers 65 over the screen support. The top flow diverter 62 is then added to the structure and this machined steel shape with a step to transition from a rounded shape on the outside of the screen cylinder that terminated at the diameter of the outer screen and a roughly conical interior shape that assists in uniform flow rates inside the filter cylinder, tapering from the top of the cylinder where it is welded to the rounded surface to a point approximately $1/8^{th}$ to $1/3$rd of the length of the filter cylinder The bottom ring 61 is machined from a steel and is shaped to accommodate exterior threads at the bottom with a smooth interior surface the approximate diameter of the interior of the filter cylinder and the filter cylinder is welded to the bottom ring, all welds to prevent leakage around the filter media.

Figure 7:
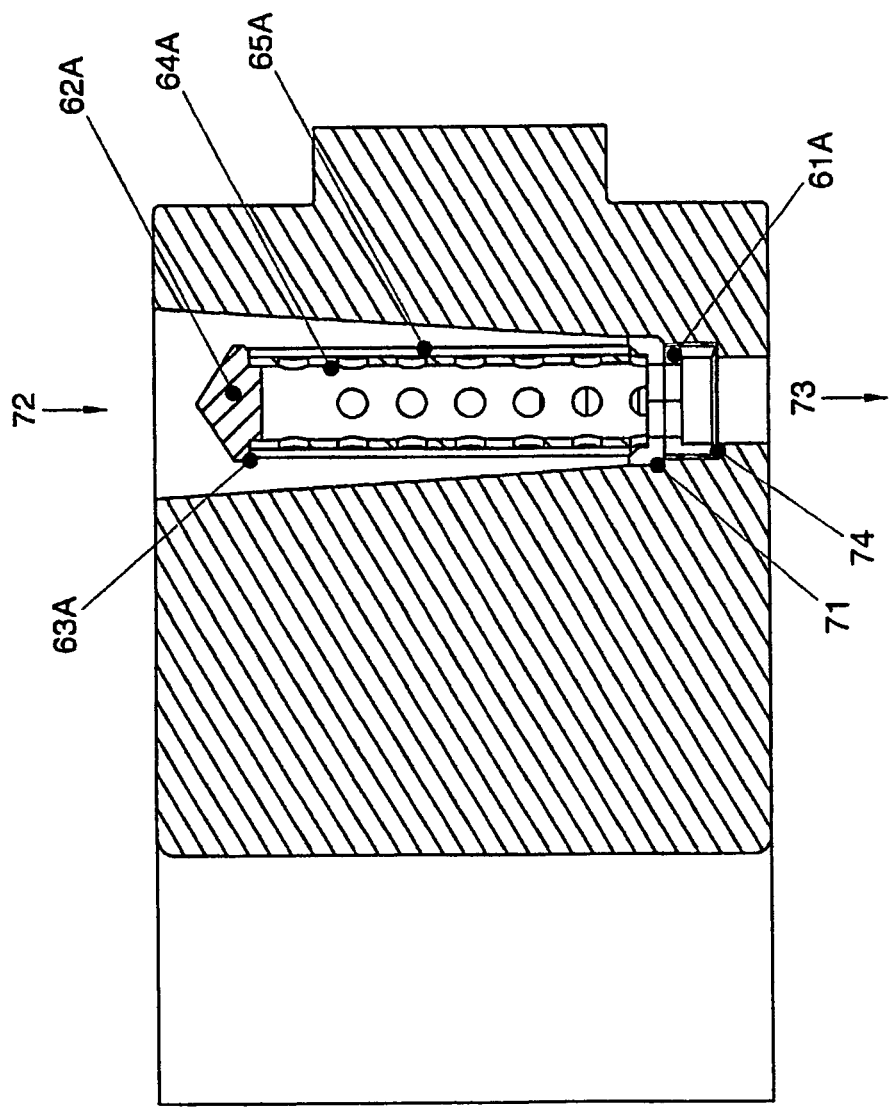
In FIG. 7, A view of a filter chamber is shown with tapered sides to improve flow to the filter cartridge and a step prior to the threaded attachment between the cartridge and the rotary disc containing the filter chambers.
Figure 8:
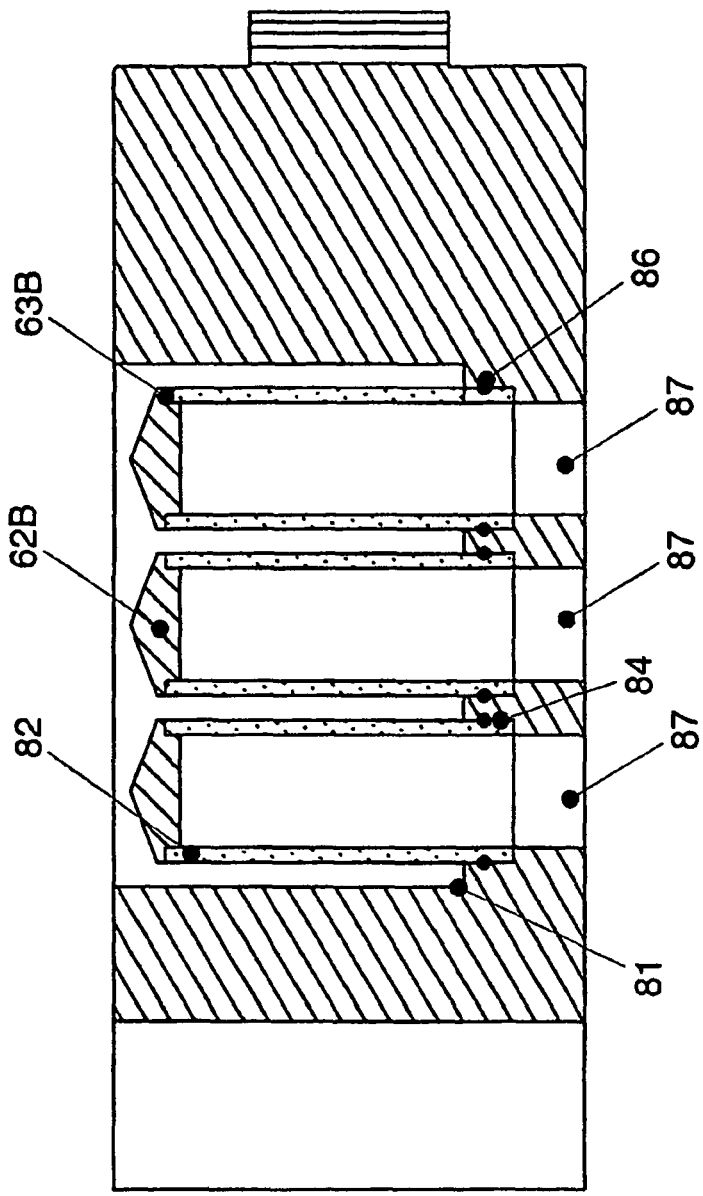
In FIG. 8, a group of cartridges are shown in a simplified common filter chamber within the rotary disc.
Figure 9:
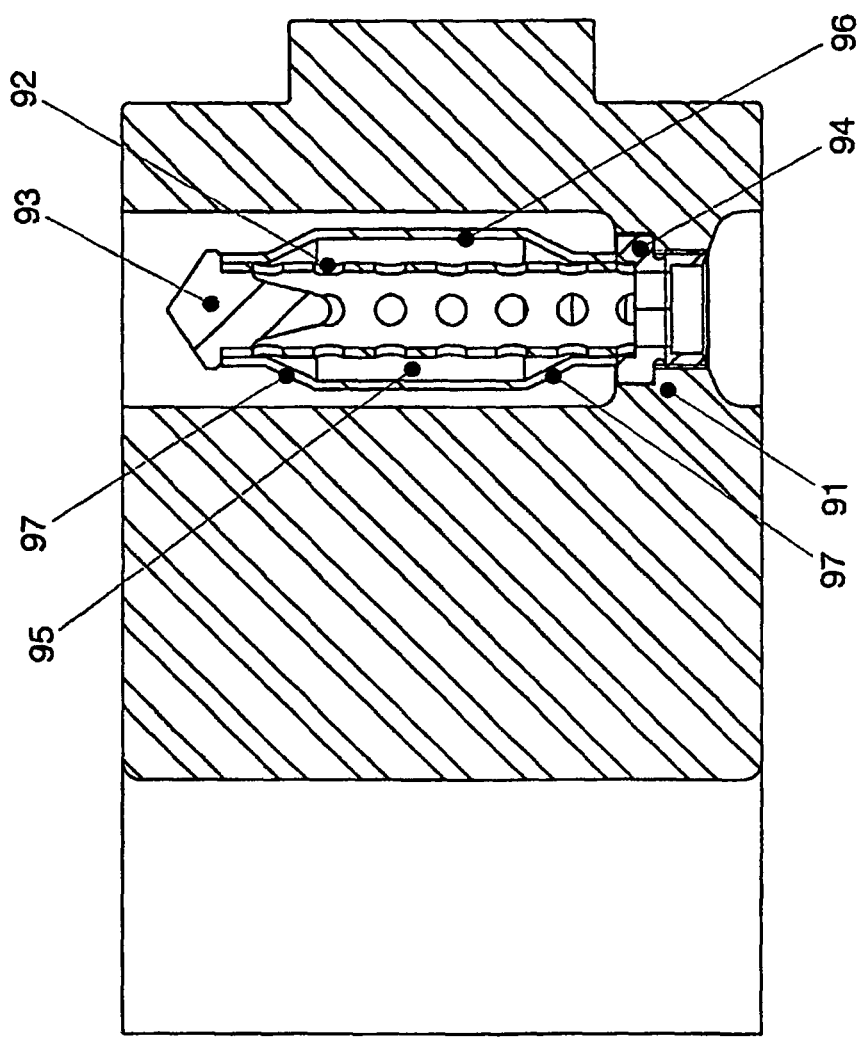
In FIG. 9 a corrugated cartridge, a reduced size version of the cartridge that may be found in some candles is shown with the swaging of the filter outer screen to provide added strength to the cartridge and aid in the eventual removal of the cartridge.
Figure 10:
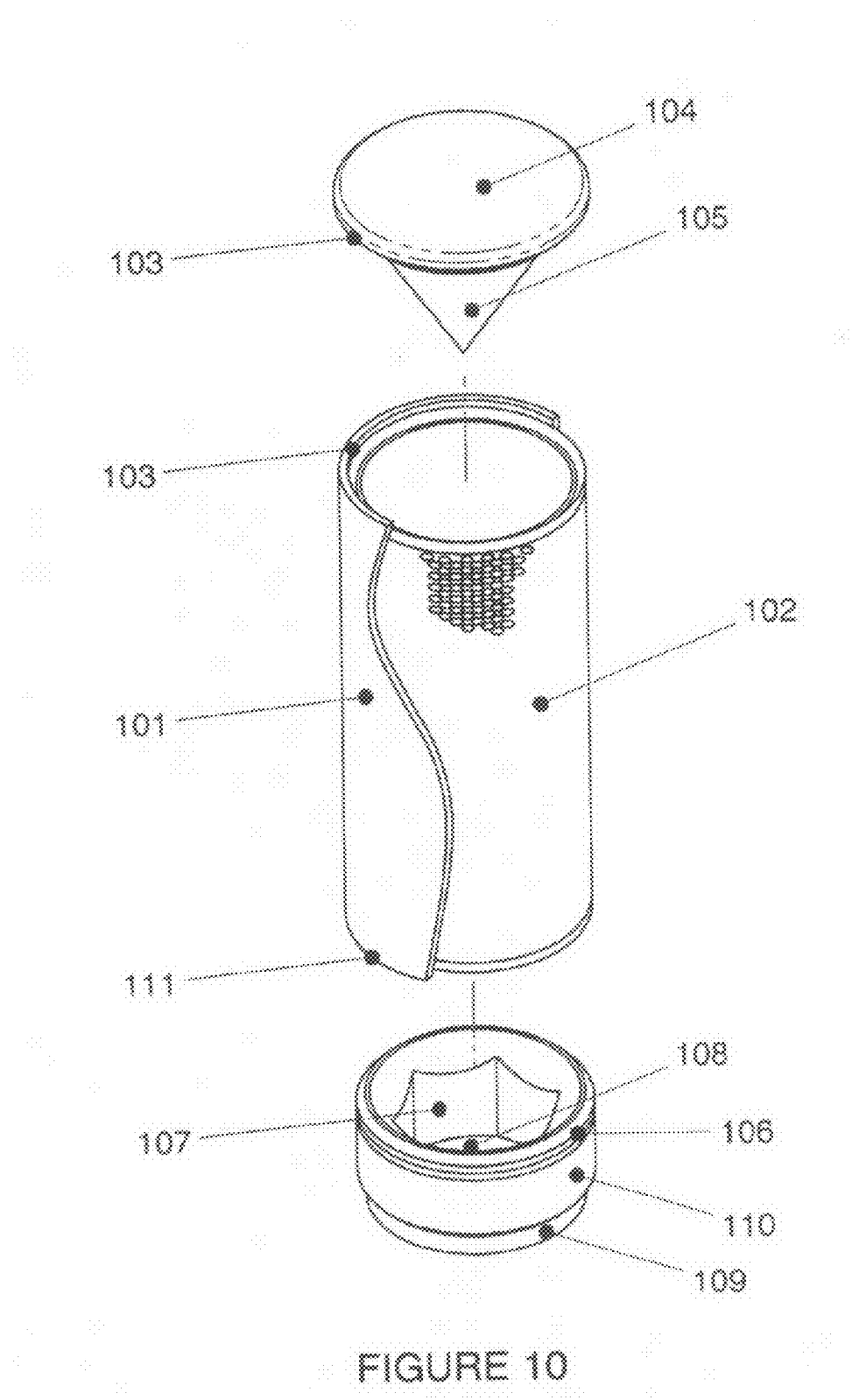
In FIG. 10 an individual cartridge is shown in exploded view to identify key elements of the cartridge. This filter construction permits the use of a removable fine filter cylinder mounted external to the filter support and held in place by compressive forces between the top and the bottom of the drain hole and attachment along the bottom.

In this preferred embodiment the filter cartridge is shown with minor variations in FIGS. 7, 8, and 9. The exploded view of a welded filter cartridge is shown in FIG. 10 where an outer screen 101 is welded into a cylinder which slides over a screen support 102. The screen and its cylindrical support is fitted and welded at point 103 to the machined top which has a projecting top 104 and a tapered flow diverter 105 machined from a single piece of steel. The bottom of the nested screen and screen support is welded at rings 106 to make a single piece with the bottom steel collar containing a removable wrench socket 107 as part of bottom drain hole 108 and thus the screens and top is a single part connected to the bottom attaching threads 109 and a sealing shoulder 110.

While the filter cartridge noted above is typical, it is obvious that a variety of filter media can be used in construction of a filter cartridge. The woven wire filter media will typically be formed, into packs which usually consist of a series of woven screens, often of a dutch weave or other weave adapted for effective filtration which consist of a mix of fine filter screens and support screens of coarser sizes on one or both sides, supporting the finer screens. Generally there is at least one fine and one or more are increasingly fine mesh size counting from the inlet side to the outlet side and then one or more final coarse support screens. One common configuration is a 20 mesh dutch weave screen, a 100 mesh dutch weave screen, a 200 mesh square weave screen and a final 100 mesh coarse screen. The screens may be spot welded to prevent separation but this is not essential. In the preferred embodiment, the screens are welded but since this does slightly cut the available area, woven cylinders and screens with multiple layers woven as one structure are also possible.

The cartridge containing disc as machined, ground, polished, heat treated and coated is then used as the filter containing rotary filtration disc in a rotary filter.

In a second embodiment of the invention, the disc is machined with individual filter chambers each within a tapered hole that terminates in an attachment for the filter such as a threaded bottom of the filter drain hole as shown in FIG. 5. The disc is clamped between an inflow block 2D and an outflow block 5D as in the examples above. Fluid may flow from the inflow passage 1D through the disc holes and filter cartridges to a mirror image flow passage in outflow block 5D. Three to five annular rings are machined in the disc with the contained filter chambers aligned in a non-radial pattern such that from an inflow passage on the inflow side of a filter rotary disc the polymer may pass from the inflow chamber through a number of holes in the rotary disc portion in contact with the inflow passage and out into a matching outflow passage also in contact with the rotary disc such that the flow is from the inflow through the disc filter holes 51 to the outflow passage and that there is a constant addition and elimination of individual holes, never a multiple addition or elimination of holes in contact with the inflow or outflow passages. In this embodiment the filter cartridges 52 are shown attached to the disc by a ring 53 with threaded bottom and where the filter cartridge is capped by a metal flow diverter 54

Figure 6:
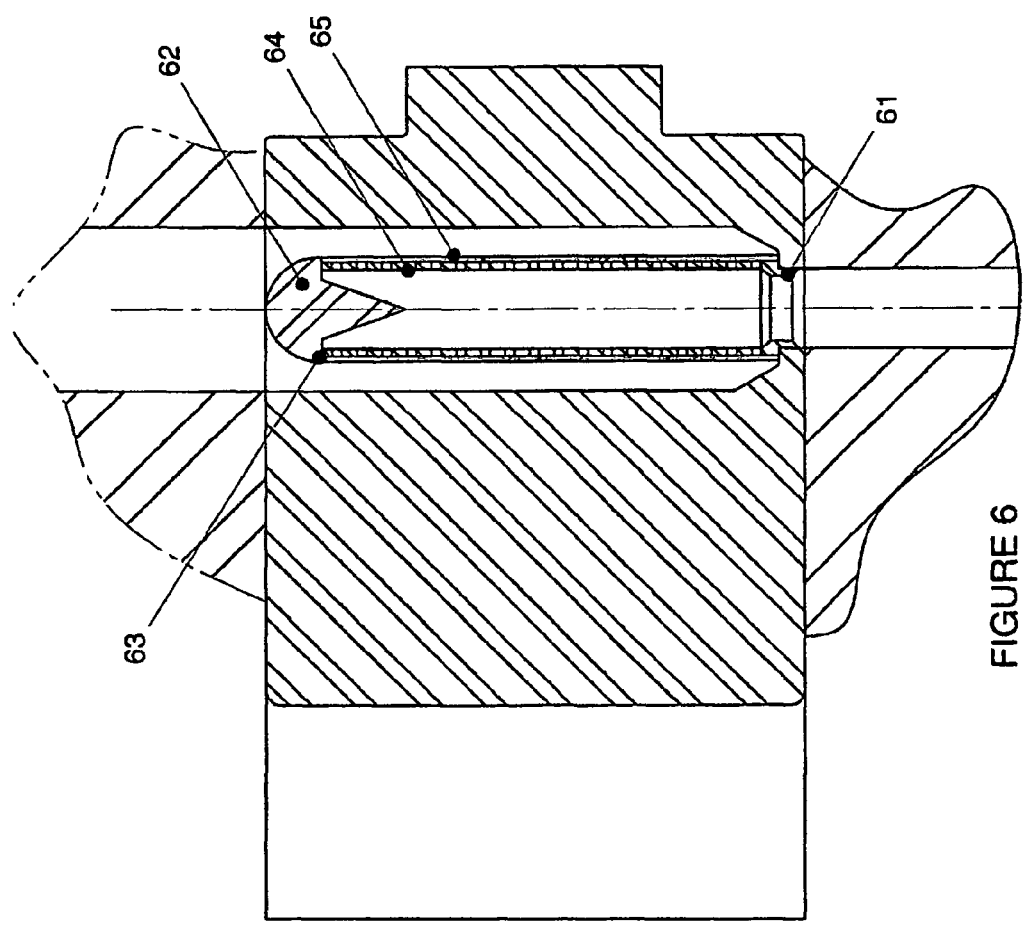
In FIG. 6, a view of a single cartridge chamber is shown with the components of a filter cartridge identified.

The filter holes for the second embodiment are straight or parallel as shown in 51 of FIG. 5 and in FIG. 6 of the Drawings.

In a third embodiment of the invention, the disc is machined with individual filter chambers each within a tapered hole that terminates in an inward oriented (smaller diameter) step which contains an attachment for the filter such as a threaded bottom of the filter drain hole as shown in FIG. 7. The cartridge in FIG. 7 has a top 62A, a screen support 64A covered with screens 65A. The cartridge base 61A has a step 71A for sealing and the fluid flows from inflow 72 through the cartridge to outflow 73. A single ring or two to five annular rings with the filter chambers aligned in a non-radial pattern such that from an inflow passage on the inflow side of a filter rotary disc the polymer may pass from the inflow chamber through a number of holes in the rotary disc portion in contact with the inflow passage and out into a matching outflow passage also in contact with the rotary disc such that the flow is from the inflow through the disc filter holes to the outflow passage and that there is a constant addition and elimination of individual holes, never a multiple addition or elimination of holes in contact with the inflow or outflow passages.

The filter holes for the third embodiment are straight sided with the inward step as shown in FIG. 8 of the Drawings. A step 81 and slidable contact area 84 for the screen cylinder is one possible way for a screen to be used without the expensive and hard to remove bottom ring while still providing frictional seals at 86. A ring to add sealing may also be utilized.

In a fourth embodiment of the invention, the disc is machined as in the most preferred embodiment and the addition of a step before the threaded portion of the bottom filter cartridge ring shown as 74 in FIG. 7 adds to the sealing ability of the filter cartridge and further locks the cartridge into place within the rotary disc.

In a fifth embodiment of the invention the disc is machined as in the most preferred embodiment and the addition of a counter bore from the outflow side of the rotary disc for each of the filter cartridges is provided. Each bottom of the filter cartridge is supplied with a groove which accommodates a retainer ring around the portion of the filter chamber bottom which projects into the counter bore area. The spring steel ring snaps into place and thus holds it in place.

In a sixth embodiment the filter cartridge is modified to accommodate a corrugated filter media as shown in FIG. 9, which further greatly expands the amount of fine filter media. Even in a constrained space such as the drain hole location of the filter cartridge, corrugating the filter media around a central support can provide an additional 5 times the area of the finer filter screen which extends the life of a cartridge and thus improves the economics of cartridge filter use. The cartridge is produced with a support cylinder, 92, running axially the length and to which is affixed the top flow diverter 93 and the bottom attaching ring 94. A folded or corrugated filter media is arrayed on the exterior surface of this support cylinder, 95.

The folds or corrugations of the exterior filter media run axially, parallel to the axis of the cylinder and these folded filter media are further surrounded with another coarse mesh filter media or screen outside cylinder, 96, annularly deposed along the axis of the support cylinder. The top and bottom edges of the outside cylinder are swaged at 97 to fit the diameter of the top and bottoms of the filter cartridge and this swaging closes and prevents flow at areas where the corrugated filter media is absent, thus insuring that all fluid flows through the finer corrugated filter media as the fluid communicates from the inlet flow passage through the filter cartridge to the outlet flow passage. A step 91 adds to the sealing of the flow.

Figure 11:
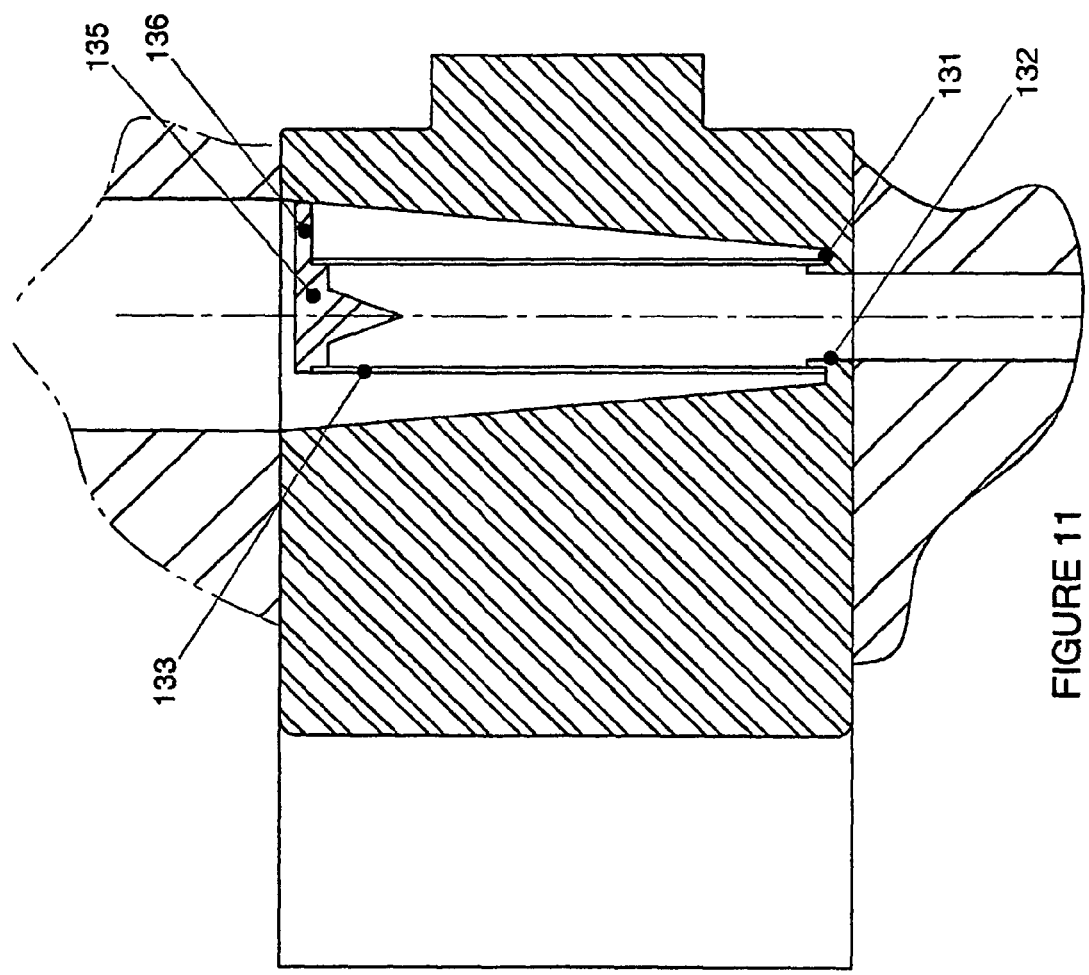
In FIG. 11 the exploded view of a single filter cartridge is shown with the component parts as it fits into a rotary filter disc

In a seventh embodiment the filter cartridge is designed such that the holddown is a combination of either the frictional force between the cartridge and the wall of the drain hole exit or the downward forces applied by the flow of polymer or other fluids through the filter containing holes. This version, shown as FIG. 11 has a bottom support 131 that holds the screen 133 in its upper cylindrical projection 132 and that fits within the hole and is held in place by the downward force of polymer flow. A top 135 has a centering wing to prevent horizontal displacement of the screen as part of the deflector shape.

While specific configurations are discussed and revealed as embodiments, the words used herein should not be construed in a broader context than the text permits and all holddowns, filter cartridge configurations, and drain hole systems and combinations are part of a technology disclosed herein that permits the use of cartridges in a rotary disc filter for polymers and similar viscous materials. The concept is especially valid for rotary filters since the rotary filter is essentially unique in its use of metal to metal rotating seals in filters. The application of the broad concepts herein as slightly modified versions are included within the broad concept of this invention.

I claim:

1. A rotary screen changer comprising:
   a rotary filter disc with a fluid inflow side and a fluid outflow side wherein said rotary filter disc has an annular area comprising a series of filter chambers, each said filter chamber comprising:
   a machined area in the fluid inflow side of said rotary filter disc;
   side walls, wherein said side walls are formed by webs, each said web separating adjacent filter chambers;
   a bottom portion comprising a plurality of drain holes wherein each of said plurality of drain holes has a bottom attachment; and
   a plurality of cylindrical filter cartridges comprising a solid metal top that is shaped to provide even flow within said filter cartridge;
   said bottom portion comprises a removable plate which is machined to have a flow encouraging contour and is a support for said cylindrical filter cartridges which are mounted thereto; and
   each of said plurality of drain holes comprises one of the plurality of cylindrical filter cartridges attached thereto by way of said bottom attachment therein placing each of said plurality of filter cartridges in the fluid flow path;
   where, in operation, fluid flows from said inflow side of said filter rotary filter disc, into said filter chamber, through said filter cartridge and through said bottom of said filter chamber to said outflow side of said rotary filter disc.

2. The rotary screen changer according to claim 1 wherein said bottom attachments are threads or locking slots.

3. The rotary screen changer according to claim 1 wherein the removable plate is mounted to said cylindrical filter cartridges by rings within grooves on said filter cartridges.

4. The rotary screen changer according to claim 1 wherein said filter cartridges expand the usable surface area within the filter chamber.

5. The rotary screen changer according to claim 4 wherein each of said filter cartridges comprise at least one layer of filter media which is corrugated therein having expanded surface area.

6. The rotary screen changer according to claim 5, wherein said filter cartridges are swaged or reduced in diameter at the ends of the filter cartridge to prevent fluid from bypassing said filter media.

* * * * *